Patented Oct. 15, 1929

1,731,364

UNITED STATES PATENT OFFICE

FOORD VON BICHOWSKY, OF GLENDALE, CALIFORNIA

ALKALI-METAL COMPOUND OF A SUBOXIDE OF TITANIUM AND DERIVATIVES THEREFROM

No Drawing.        Application filed June 4, 1923. Serial No. 643,440.

This discovery relates in particular to the alkali metal compounds of titanium in which the titanium exists in the form of a sub-oxide $Ti_3O_5$ and to the technically valuable compounds which may be derived therefrom.

In this invention I make no claim to the process of manufacture of these compounds as that has already been described in my Patent No. 1,472,403, issued October 30, 1923, relating to the synthetic production of alkali metal cyanides and it is while carrying out the process of that patent that the new and novel compounds herein described are formed.

As an example of the formation of these various compounds I will cite a number of examples all of which and many others come under the scope of my already filed patent.

Example No. 1

If titanium cyanonitride, titanium carbide and sodium carbonate be heated with stirring for forty five minutes at a temperature of 800° C. in an indifferent atmosphere and in the proportions indicated by the following equation there results both sodium cyanide and a new titanium compound which I have named "sodium ortho trititanite" or $Na_4Ti_3O_7$ but which can also be represented thus $$2Na_2O \cdot Ti_3O_5.$$

It is formed as indicated:

$$Ti_{10}C_2N_8 + 2TiC + 12Na_2CO_3 = 4Na_4Ti_3O_7 + 8NaCN + 8CO.$$

This new compound has a bluish color and occurs in the form of a dense powder. It is insoluble in hot or cold water but undergoes immediate hydrolysis, another new compound "sodium meta hexatitanite" being formed:

$$2Na_4Ti_3O_7 + 3H_2O = Na_2Ti_6O_{11} + 6NaOH.$$

This compound may also be represented as $Na_2O \cdot 2Ti_3O_5$. It is a dense powder of a lavender color which upon heating is converted through oxidation into sodium hexa titanate $Na_2Ti_6O_{13}$ the corresponding potassium salt of which is well known in its hydrated form. This sodium salt is a dense beautiful white powder and prepared in this way is in an extremely fine state of subdivision which preeminently suits it for use as a white pigment or for any other use where a white body possessing its properties is required. It melts at about 1100° C. to a clear liquid which upon cooling crystallizes in the form of glistening long needles. It is insoluble in the common cold dilute acids but dissolves quite readily in hot 60° Bé. sulphuric acid. The solution so obtained upon cooling and diluting and then boiling throws down the titanium in the form of the white dioxide.

Example No. 2

If the reaction between titanium cyanonitride, titanium carbide and sodium carbonate takes place at a higher temperature the reaction follows a different course. At 1000° C. and with fifteen minutes' heating the reaction goes thus:

$$7Ti_{10}C_2N_8 + 2TiC + 52Na_2CO_3 = 24Na_2Ti_3O_6 + 56NaCN + 12CO$$

and "sodium meta tri-titanite" $Na_2Ti_3O_6$ or $Na_2O \cdot Ti_3O_5$ is formed. This occurs in the form of a dense bluish violet cake which upon pulverizing does not dissolve in water but is hydrolyzed by the same to the already described sodium hexa-titanite. The reaction being:

$$2Na_2Ti_3O_6 + H_2O = Na_2Ti_6O_{11} + 2NaOH$$

Example No. 3

If titanium nitride be heated with barium carbide and soda to 1000° C. for twenty minutes there occurs the following reaction:

$$3Ti_2N_2 + BaC_2 + 4Na_2CO_3 = Na_2Ti_6O_{11} + 6NaCN + BaO.$$

If the so resulting reaction mass be cooled and then treated with fairly strong sulphuric acid pure hydrocyanic acid is evolved and may be recovered while the residue from the acid treatment will be found to consist of a molecular mixture of barium sulphate and sodium hexa-titanite, which may then be washed with water and dried or roasted in an oxidizing atmosphere. This will result in a beautiful heavy white material most suitable as a pigment.

I claim:

1. As new chemical compounds the alkali metal compounds of the sub-oxide of titanium ($Ti_3O_5$).

2. As new chemical compounds the alkali metal compounds of the sub-oxide of titanium ($Ti_3O_5$), comprising a dense colored substance insoluble in water.

3. The ortho compounds derived from the alkali metal compounds of the sub-oxide of titanium ($Ti_3O_5$).

4. As a new chemical compound sodium ortho tri-titanite $2Na_2O \cdot Ti_3O_5$, a dense bluish colored powder insoluble in but hydrolyzed by water.

FOORD VON BICHOWSKY.